(12) United States Patent
Misawa

(10) Patent No.: US 12,143,542 B2
(45) Date of Patent: Nov. 12, 2024

(54) INSPECTION APPARATUS, METHOD OF CONTROLLING THE SAME, AND STORAGE MEDIUM

(71) Applicant: CANON KABUSHIKI KAISHA, Tokyo (JP)

(72) Inventor: Reiji Misawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/098,753

(22) Filed: Jan. 19, 2023

(65) Prior Publication Data

US 2023/0239412 A1 Jul. 27, 2023

(30) Foreign Application Priority Data

Jan. 26, 2022 (JP) .................. 2022-010361

(51) Int. Cl.
*H04N 1/00* (2006.01)
*G06K 15/02* (2006.01)
*G06T 7/00* (2017.01)
*H04N 1/409* (2006.01)

(52) U.S. Cl.
CPC ....... *H04N 1/00045* (2013.01); *G06K 15/027* (2013.01); *G06T 7/001* (2013.01); *H04N 1/00037* (2013.01); *H04N 1/0097* (2013.01); *H04N 1/4092* (2013.01); *G06T 2207/30144* (2013.01)

(58) Field of Classification Search
CPC ........... H04N 1/00045; H04N 1/00037; H04N 1/0097; H04N 1/4092; G06K 15/027; G06T 7/001; G06T 2207/30144

USPC ....................................... 358/3.27, 1.9, 1.15
See application file for complete search history.

(56) References Cited

U.S. PATENT DOCUMENTS

| 9,170,543 B2 | 10/2015 | Arakawa | |
|---|---|---|---|
| 2012/0019844 A1* | 1/2012 | Tonami | G06K 15/027 358/1.9 |
| 2020/0286218 A1* | 9/2020 | Ikeda | G06T 7/136 |

FOREIGN PATENT DOCUMENTS

JP 2013-123812 A 6/2013

* cited by examiner

*Primary Examiner* — Quang N Vo
(74) *Attorney, Agent, or Firm* — VENABLE LLP

(57) ABSTRACT

An inspection apparatus inspects image data obtained by reading a sheet using a reference image of the image data. The inspection apparatus obtains first image data by reading a sheet having lines printed thereon, obtains second image data from print data of the lines, performs edge correction on the lines included in the second image data by applying a plurality of edge correction parameters being different from each other, and determines an edge correction parameter of the plurality of edge correction parameters that minimizes a difference between a density of the second image data subjected to the edge correction and a density of the first image data. In addition, edge correction is performed on the reference image using the determined edge correction parameter, and image data obtained by reading a sheet of an inspection target using the reference image on which the edge correction has been performed is inspected.

8 Claims, 14 Drawing Sheets

PATCH DENSITY 15%

EDGE CORRECTION PARAMETER 1
PATCH DENSITY 5%

EDGE CORRECTION PARAMETER 2
PATCH DENSITY 10%

EDGE CORRECTION PARAMETER 3
PATCH DENSITY 16%

FIG. 13A

CALIBRATION SETTING

SELECT DATA TO BE USED.
GENERATE FROM NEW REGISTRATION IF THERE IS NO DATA IN LIST.

| NAME | SHEET SIZE | PAPER TYPE | REGISTRATION DATE AND TIME |
|---|---|---|---|
| CALIBRATION DATA 1 | A4 | PLAIN PAPER | YYYMMDD |
| CALIBRATION DATA 2 | A3 | PLAIN PAPER | YYYMMDD |
|  |  |  |  |

| NEWLY REGISTER | DELETE | OK | CANCEL |
|---|---|---|---|
| 1301 | 1302 | 1303 | 1304 |

FIG. 13B

CALIBRATION REGISTRATION

PLEASE SELECT SHEET SIZE · PAPER TYPE

NAME — CALIBRATION DATA 3

SHEET SIZE — A4 ▼

PAPER TYPE — THICK PAPER ▼

1305 — OK         CANCEL — 1306

FIG. 14A
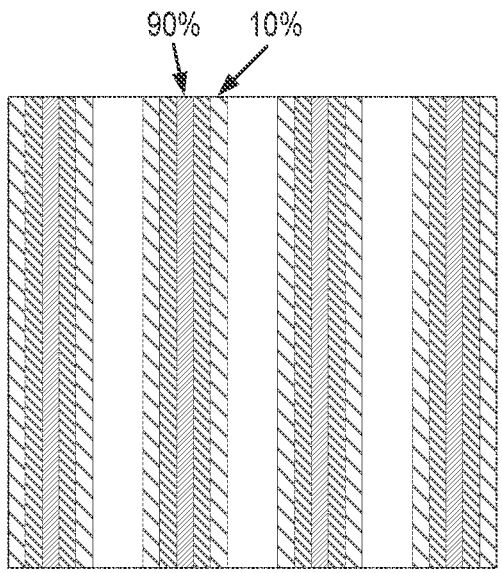
FIG. 14B
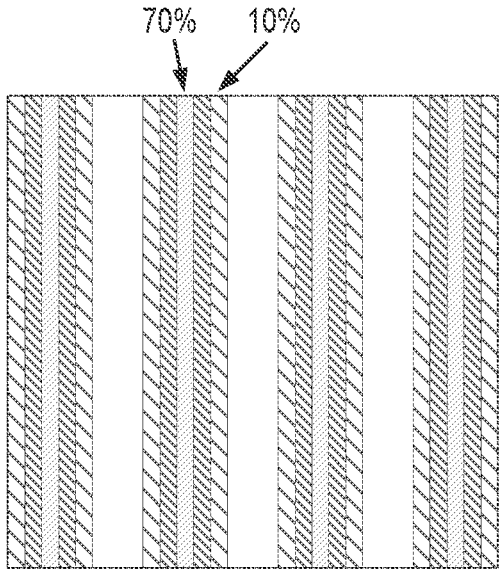
FIG. 14C
$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} e \\ f \end{pmatrix}$$
FIG. 15A
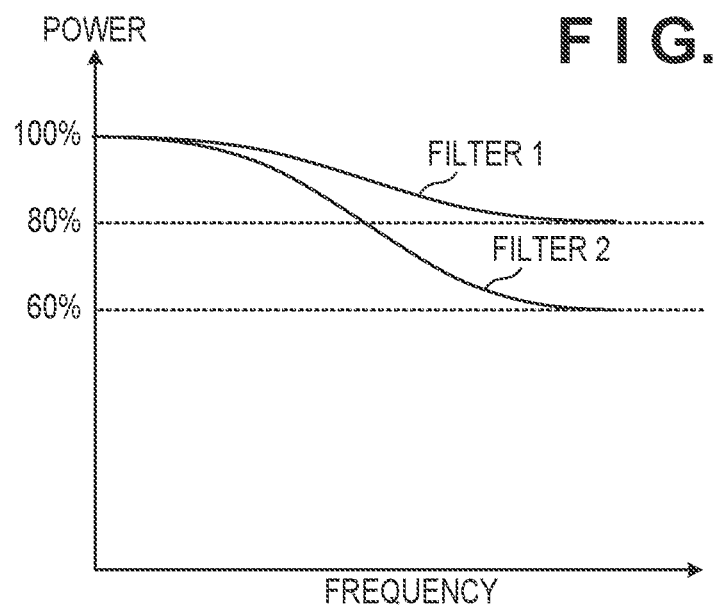

FIG. 15B

| EDGE CORRECTION PARAMETER | THICKENING PROCESSING | SMOOTHING PROCESSING |
|---|---|---|
| EDGE CORRECTION PARAMETER 1 | WITHOUT THICKENING PROCESSING | SMOOTHING PROCESSING (FIXED) |
| EDGE CORRECTION PARAMETER 2 | THICKENED IN 1 LEVEL (FIRST SMOOTHING PROCESSING + FIRST EDGE ENHANCEMENT) | SMOOTHING PROCESSING (FIXED) |
| EDGE CORRECTION PARAMETER 3 | THICKENED IN 2 LEVELS (SECOND SMOOTHING PROCESSING + SECOND EDGE ENHANCEMENT) | SMOOTHING PROCESSING (FIXED) |
| EDGE CORRECTION PARAMETER N | THICKENED IN (N - 1) LEVELS (Nth SMOOTHING PROCESSING + Nth EDGE ENHANCEMENT) | SMOOTHING PROCESSING (FIXED) |

FIG. 15C

| CALIBRATION DATA | SHEET SIZE | PAPER TYPE | EDGE CORRECTION PARAMETER |
|---|---|---|---|
| CALIBRATION DATA 1 | A4 | NORMAL PAPER | EDGE CORRECTION PARAMETER 1 |
| CALIBRATION DATA 2 | A3 | NORMAL PAPER | EDGE CORRECTION PARAMETER 2 |
| CALIBRATION DATA 3 | A4 | THICK PAPER | EDGE CORRECTION PARAMETER 3 |

INSPECTION APPARATUS, METHOD OF CONTROLLING THE SAME, AND STORAGE MEDIUM

BACKGROUND OF THE INVENTION

Field of the Invention

The invention relates to an inspection apparatus, a method of controlling the same, and a storage medium.

Description of the Related Art

A print bookbinding system such as a Print On Demand (POD) printer may include an inspection system that recognizes (inspects) the quality of an image formed on a printed output sheet (printed product), and detects an image anomaly. Inspection processing in the inspection system is performed such that alignment between Raster Image Processing (RIP) data (reference image) obtained by deploying page description language (PDL) data used for printing a printed product and a scanned image (inspection target image data) obtained by scanning the printed product is performed. Subsequently, collation and determination processing on the reference image and the scanned image is performed to determine the image quality of the printed product and detect an image anomaly.

In Japanese Patent Laid-Open No. 2013-123812, a system is described in which RIP data (reference image) and a scanned image (inspection target image data) are used for inspecting the image quality of a printed product.

Here, in the process of the aforementioned inspection processing, a difference of edge reproducibility may occur between the RIP data (reference image) used for printing and the scanned image (inspection target image) obtained by scanning the printed product. For example, mainly an edge portion or a fine line in the scanned image may be drawn thicker than the RIP data due to an effect attributable to dot gain or reading, or the like. Such an effect may raise a problem of increased difference between the scanned image and the reference image, which may increase over-detection. On the other hand, suppressing the detection rate to suppress increase of such over-detection may raise an adverse effect such as detection failure of an image anomaly (defect) which originally should be detected.

SUMMARY OF THE INVENTION

An aspect of the present invention is to eliminate the above-mentioned problem with conventional technology.

A feature of the present invention is to provide a technique for solving the aforementioned problem by matching the reproducibility of edges in the reference image and the inspection target image.

According to a first aspect of the present invention, there is provided an inspection apparatus for detecting a difference between image data obtained by reading a sheet, and a reference image of the image data, the inspection apparatus comprising: one or more controllers including one or more processors and one or more memories, the one or more controllers being configured to: obtain first image data by reading a sheet having a patch image printed thereon, obtain second image data from print data of the patch image, perform edge correction on a line included in the second image data by applying an edge correction parameter, and obtain an edge correction parameter that minimizes a difference between the density of the second image data subjected to the edge correction and the density of the first image data, and store the obtained edge correction parameter.

According to a second aspect of the present invention, there is provided an inspection apparatus for detecting a difference between image data obtained by reading a sheet, and a reference image of the image data, the inspection apparatus comprising: one or more controllers including one or more processors and one or more memories, the one or more controllers being configured to: obtain first image data by reading a sheet having a patch image printed thereon, obtain second image data from print data of the patch image, obtain an edge correction parameter that minimizes a difference between a density of an edge of a line included in the first image data and a density of an edge of a line included in the second image data, and perform edge correction of the reference image using the obtained edge correction parameter, and collate inspection target image data obtained by reading the sheet with the corrected reference image.

According to a third aspect of the present invention, there is provided an inspection apparatus for detecting a difference between inspection target image data obtained by reading a sheet, and a reference image of the inspection target image data, the inspection apparatus comprising: one or more controllers including one or more processors and one or more memories, the one or more controllers being configured to: store an edge correction parameter that minimizes a difference between a density of first image data obtained by reading a sheet having a patch image printed thereon, and a density of second image data obtained from print data of the patch image, select, from the edge correction parameters stored, an edge correction parameter for correcting the reference image, in inspecting a sheet, correct the reference image of the inspection target image data or the first image data, using the selected edge correction parameter, and collate the corrected reference image with the inspection target image data, or collate the reference image with the corrected first image data.

According to a fourth aspect of the present invention, there is provided an inspection apparatus for detecting a difference between inspection target image data obtained by reading a sheet, and a reference image of the inspection target image data, the apparatus comprising: one or more controllers including one or more processors and one or more memories, the one or more controllers being configured to: obtain first image data by reading a sheet having a patch image printed thereon, obtain second image data from print data of the patch image, select filtering processing for the second image data based on an MTF of the first image data and correct the second image data, and detect the difference by collating the first image data and the corrected second image data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13A is a diagram illustrating an example of a calibration setting screen according to the first embodiment;

FIG. 13B is a diagram illustrating an example of a calibration registration screen;

FIGS. 14A and 14B are enlarged schematic diagrams of a reference region of a patch image obtained by scanning in step S802 of the first embodiment;

FIG. 14C is a diagram illustrating a conversion equation for affine transform;

FIG. 15A is a diagram explaining a filter in a second embodiment;

FIG. 15B is a diagram illustrating a relation between the edge correction parameter, thickening processing, and smoothing processing, according to the first embodiment; and FIG. 15C is a diagram illustrating an example of storing the edge correction parameter according to the first embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Exemplary Embodiment

Figure 1:
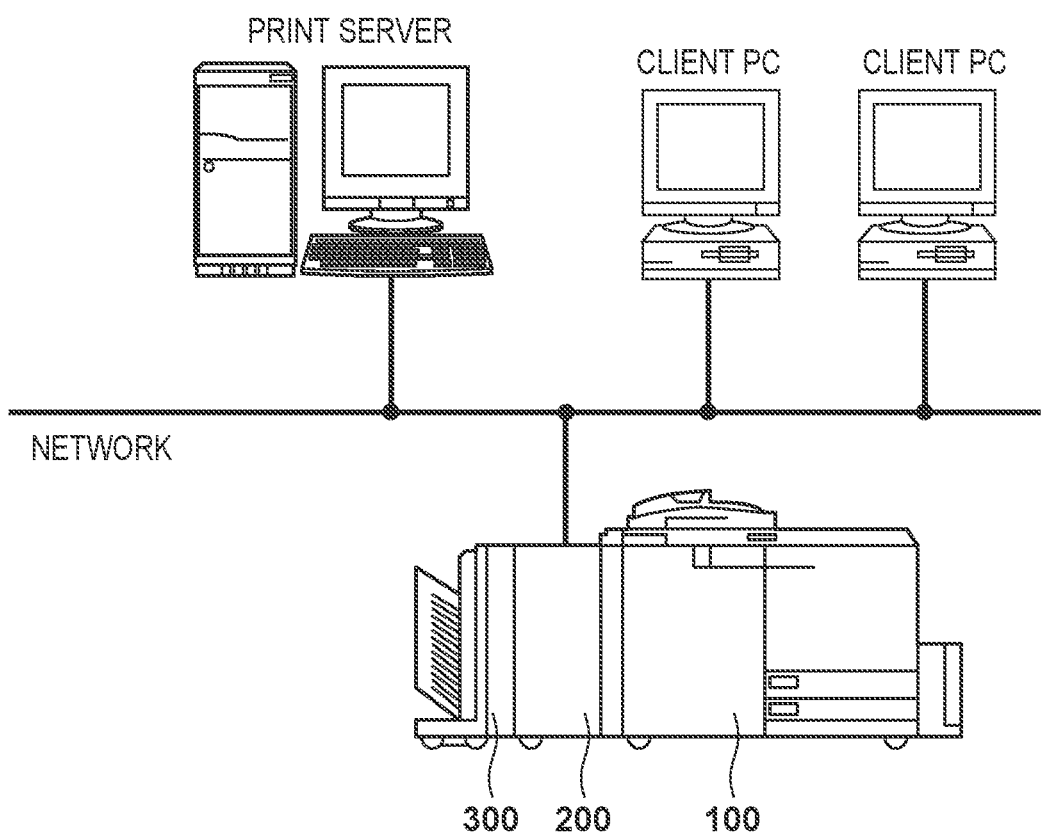
FIG. 1 is a diagram illustrating an example of a system configuration including an inspection apparatus according to a first embodiment of the present invention.

FIG. 1 is a diagram illustrating an example of a system configuration including an inspection apparatus according to a first embodiment of the present invention.

An image forming apparatus 100 processes various types of input data and prints out. An inspection apparatus 200 receives a printed product that is printed and discharged by the image forming apparatus 100, and inspects the content of the printed product. A finisher 300 receives output sheets (printed products) inspected by the inspection apparatus 200 and executes post processing such as bookbinding. The image forming apparatus 100 is connected to an external print server or a client PC via a network. In addition, the inspection apparatus 200 is connected on a one-to-one basis to the image forming apparatus 100 via a communication cable. Additionally, the finisher 300 is also connected on a one-to-one basis to the image forming apparatus 100 via a different communication cable from that described above. In addition, the inspection apparatus 200 and the finisher 300 are connected to each other via another communication cable. The first embodiment presents an in-line inspection system that consistently performs image formation, image inspection, and finishing.

Figure 2:
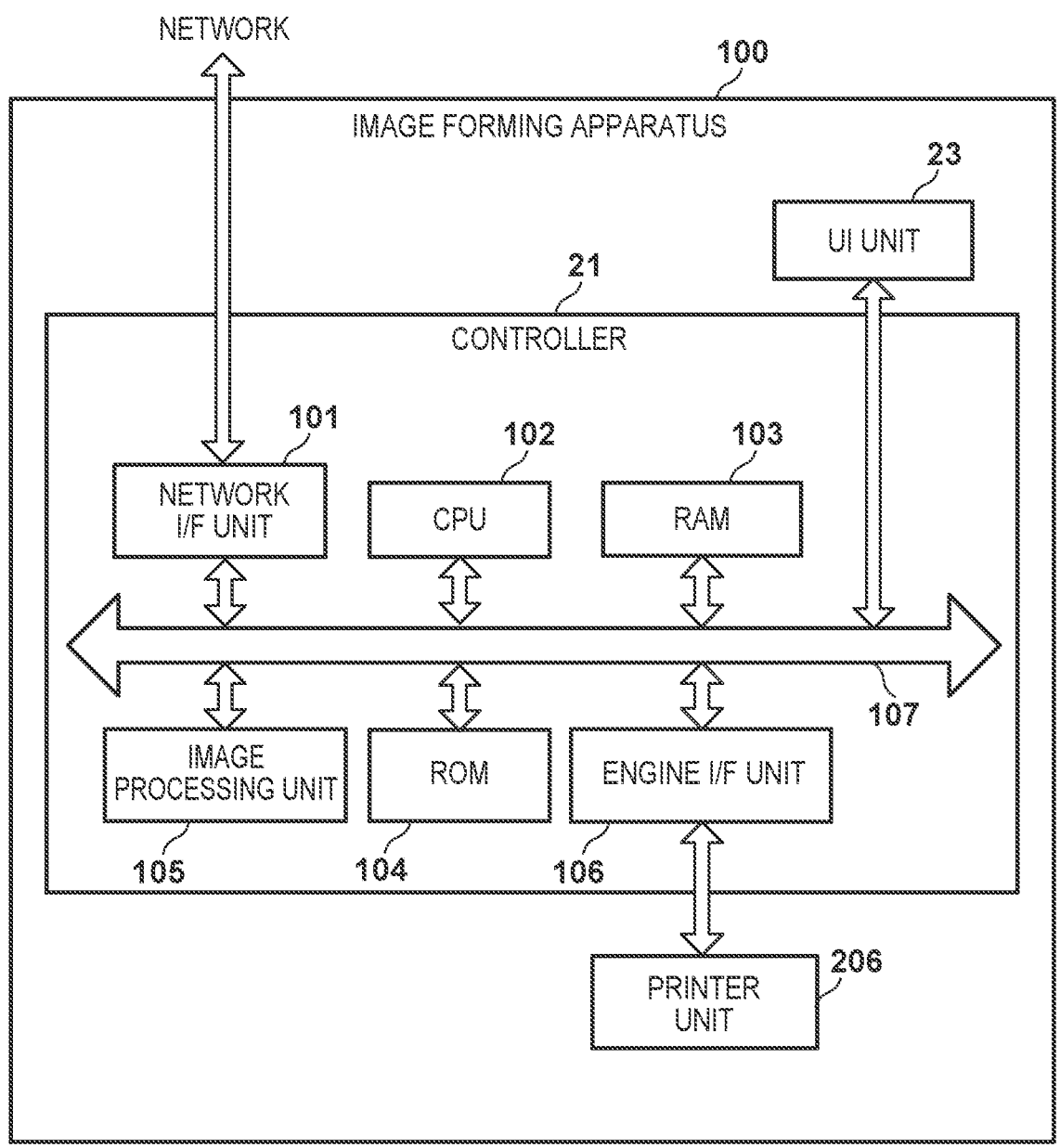
FIG. 2 is a block diagram explaining a hardware configuration of an image forming apparatus according to the first embodiment.

FIG. 2 is a block diagram explaining a hardware configuration of the image forming apparatus 100 according to the first embodiment.

The image forming apparatus 100, which is an example of an image forming apparatus of the present invention, includes a controller 21, a printer unit 206, and a User interface (UI) unit (console unit) 23. Here, the UI unit 23 includes various switches, display, or the like for user operation.

Image data or document data (not illustrated), which is generated by software application such as a printer driver, on a client PC or a print server on a network, is transmitted as PDL data to the image forming apparatus 100 via a network (e.g., Local Area Network). In the image forming apparatus 100, the controller 21 receives the transmitted PDL data. Upon receiving the PDL data from the client PC or the print server, the controller 21 connected to the printer unit 206 converts the PDL data into print data that can be processed by the printer unit 206, and outputs the print data to the printer unit 206.

The printer unit 206 prints an image based on the print data output from the controller 21. Here, the printer unit 206 according to the first embodiment is assumed to be an electrophotographic print engine. However, the print method is not limited thereto and may use an ink jet (IJ) method, for example.

The UI unit 23 is operated by a user, and used for selecting various functions and providing operation instructions. The UI unit 23 includes a display unit provided with a touch panel on its surface, a keyboard having arranged thereon various types of keys such as a start key, a stop key, a numeric keypad, or the like.

Next, the controller 21 will be described in detail. The controller 21 includes a network interface (I/F) unit 101, a CPU 102, a RAM 103, a ROM 104, an image processing unit 105, an engine interface (I/F) unit 106, and an internal bus 107. The network I/F unit 101 is an interface configured to receive PDL data transmitted from a client PC or a print server. The CPU 102 controls the entire image forming apparatus 100 using programs and data stored in the RAM 103 or the ROM 104, and also executes a process performed by the controller 21 described below. The RAM 103 provides a work area to be used when the CPU 102 executes various processes. The ROM 104 has stored therein programs and data, for causing the CPU 102 to execute various processes described below, together with setting data or the like of the controller 21.

According to the settings provided from the CPU 102, the image processing unit 105 performs print image processing on the PDL data received by the network I/F unit 101, and generates print data that can be processed by the printer unit 206. The image processing unit 105 generates image data (RIP data) having a plurality of color components per pixel, particularly by rasterizing the received PDL data. The plurality of color components refer to independent color components in a color space such as RGB (red, green and blue). The image data has, for example, an 8-bit (256-gradation) value per color component for each pixel. In other words, the image data is multivalued bit map data including multivalued pixels. In addition, the aforementioned rasterizing generates, in addition to the image data, attribute data per pixel indicating each of the attributes of pixels in the image data. The attribute data, indicating the type of object a pixel belongs to, represents a value indicating the type of object such as, for example, character, line, graphic, image, background. The image processing unit 105 generates print data by performing color conversion from the RGB color space to the CMYK (cyan, magenta, yellow, black) color space, or image processing such as screen processing, using the generated image data and the attribute data.

The engine I/F unit 106 is an interface configured to transmit the print data generated by the image processing unit 105 to the printer unit 206. The internal bus 107 is a system bus configured to connect the aforementioned units for transmission of control signals or the like.

Figure 3:
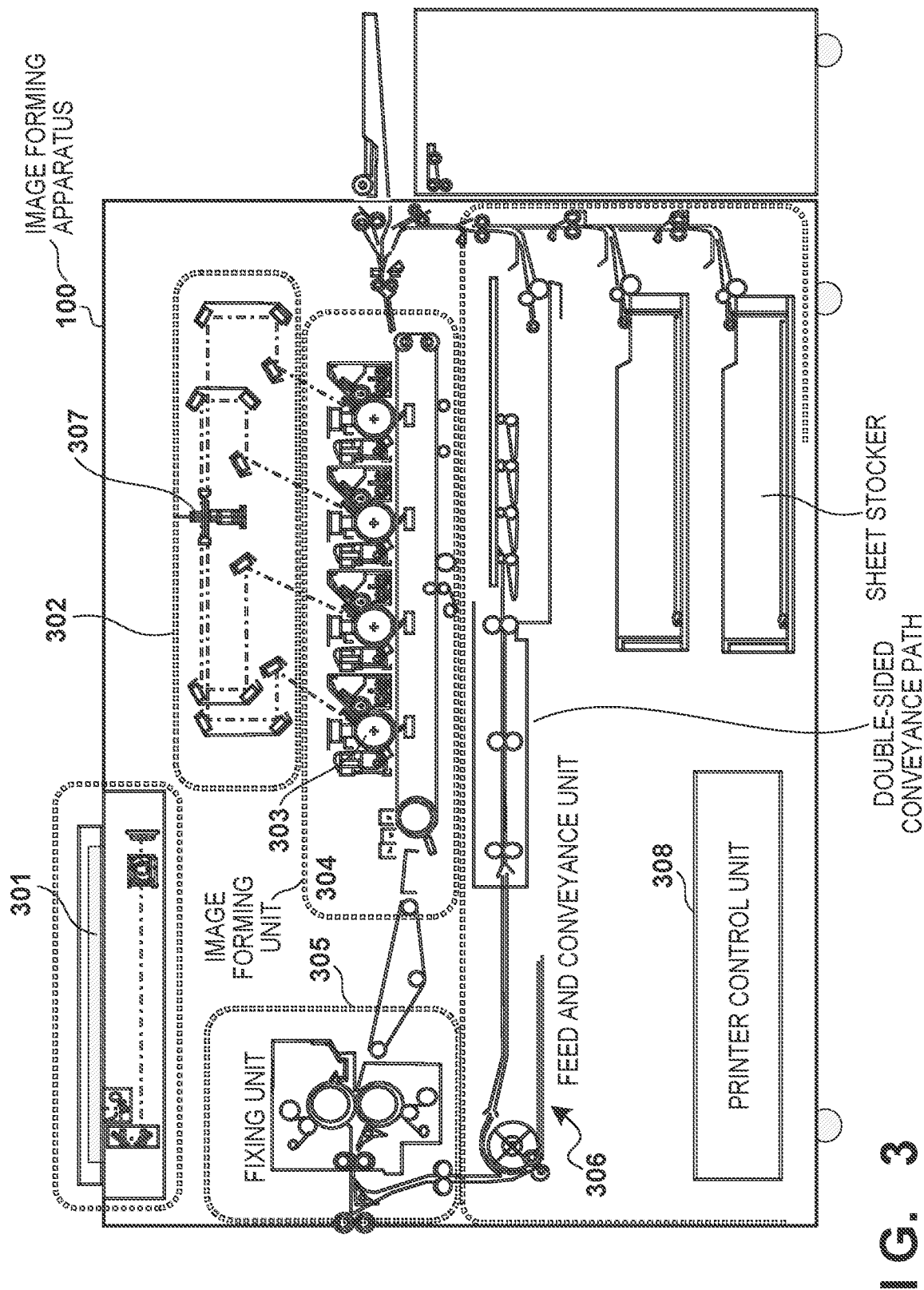
FIG. 3 is a diagram explaining a mechanism of a printer unit of the image forming apparatus according to the first embodiment.

FIG. 3 is a diagram explaining a mechanism of the printer unit 206 of the image forming apparatus 100 according to the first embodiment.

The image forming apparatus 100 includes a scanner unit 301, a laser exposure unit 302, photosensitive drums 303, an image forming unit 304, a fixing unit 305, a feed and conveyance unit 306, and a printer control unit 308 configured to control these units. The scanner unit 301 illuminates an original placed on an original platen, optically reads an image of the original, and converts the image into an electrical signal to generate image data. The laser exposure unit 302 causes a beam such as a laser beam modulated in accordance with the image data to be incident on a polygon mirror 307 configured to rotate with a constant angular speed, forming reflected scanning light to irradiate the photosensitive drums 303. The image forming unit 304 rotationally drives the photosensitive drums 303 and charges them with an electrostatic charger, and develops latent images formed on the photosensitive drums by the laser exposure unit 302 with toner. Subsequently, the image forming unit 304 realizes image formation by including four consecutive developing units (developing stations) to perform a series of electrophotographic processes such as transferring toner images to a sheet, and recovering fine toner remaining on the photosensitive drums without being transferred at the transferring.

Four consecutive developing units arranged in the order of cyan (C), magenta (M), yellow (Y), and black (K) sequentially execute image forming operations for colors magenta, yellow and black to form the toner images of respective four colors after a predetermined time has elapsed after the start of the cyan station.

The fixing unit 305, including rollers and belts, and a heat source such as a halogen heater built therein, melts and fixes, by heat and pressure, the toners on the sheet having the toner images transferred thereto by the image forming unit 304. Here, when printing on a thick print paper, which is a thick paper and heat conductivity is poor, it is necessary to reduce the speed of passing through the fixing unit 305 to, for example, half the normal speed. Consequently, when printing on a thick print paper, the sheet conveyance speed in units other than the fixing unit 305 is also reduced to half, whereby the printing speed of the image forming apparatus 100 itself is reduced to half.

The feed and conveyance unit 306, including one or more sheet stockers represented by paper cassettes or paper decks, separates one sheet from a plurality of sheets stored in the sheet stockers in response to an instruction from the printer control unit 308, and conveys it to the image forming unit 304. On the sheet being conveyed in the aforementioned manner, the toner images of respective colors are transferred by the development station described above, and eventually a full-color image is formed on the sheet. In addition, when images are formed on both sides of a sheet, the sheet having passed through the fixing unit 305 is controlled to travel again on a conveyance path leading to the image forming unit 304.

The printer control unit 308 communicates with the controller 21 configured to control the entire image forming apparatus 100, and execute control in accordance with instructions therefrom. In addition, the printer control unit 308 provides an instruction to facilitate smooth operation of the entire system in a harmonized manner, while managing the status of each of the aforementioned scanner unit, laser exposure unit, image forming unit, fixing unit, and feed and conveyance unit.

Figure 4A:
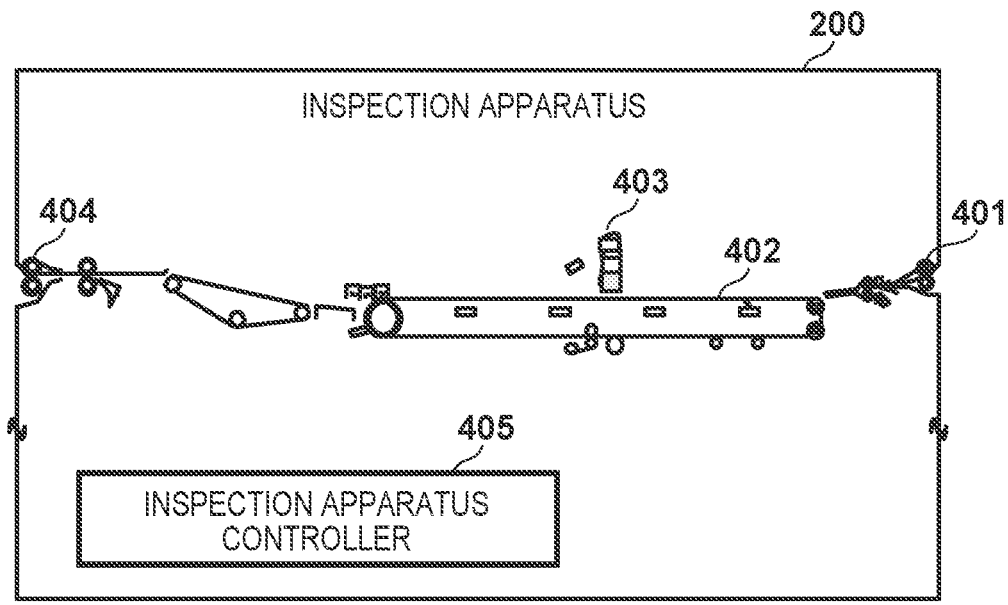
FIG. 4A is a diagram explaining an overview of an internal configuration diagram of the inspection apparatus according to the first embodiment.

FIG. 4A is a diagram explaining an overview of an internal configuration diagram of the inspection apparatus 200 according to the first embodiment.

The sheet (printed product) output from the image forming apparatus 100 is pulled into the inspection apparatus 200 by a feed roller 401. Subsequently, the printed product is read by an inspection sensor 403 provided on the conveyance belt 402 while being conveyed by a conveyance belt 402. An inspection apparatus controller 405 performs inspection processing using the image data (scanned image) obtained by the inspection sensor 403 that has read the printed product. The inspection apparatus controller 405 also controls the entire inspection apparatus 200. The result of inspection as described above is sent to the finisher 300. Subsequent to the inspection, the printed product is output from a sheet discharge roller 404. Although not illustrated here, the inspection sensor 403 may be structured to allow the inspection sensor to also read from below the conveyance belt 402 in order to handle a double-sided printed product.

Figure 4B:
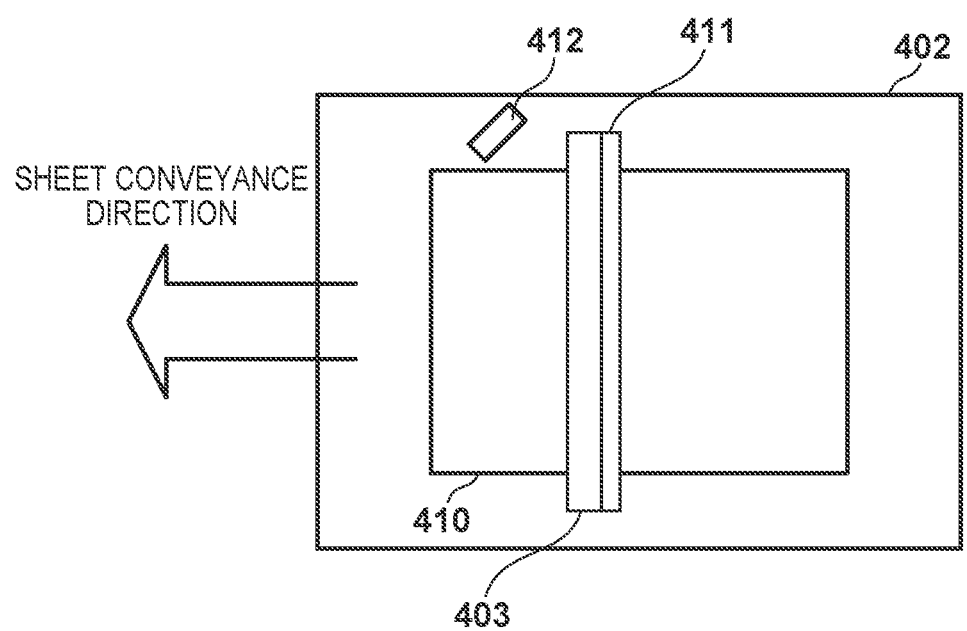
FIG. 4B depicts a top view of a conveyance belt seen from the inspection sensor side.

FIG. 4B depicts a top view of the conveyance belt 402 seen from the inspection sensor 403 side.

Here, the inspection sensor 403 is a line sensor configured to read line-by-line the image of the entire surface of the printed product 410 that has been conveyed as illustrated. An irradiation device 411 irradiates the printed product when the inspection sensor 403 reads the printed product 410. An irradiation device 412 for skew feeding detection is a device configured to detect whether or not the printed product 410 is skewed with respect to the sheet conveyance direction while the printed product 410 is conveyed on the conveyance belt 402. The irradiation device 412 for skew feeding detection irradiates light from an oblique direction with respect to the printed product 410 being conveyed, whereby the inspection sensor 403 reads the image of a shadow at the edge of the printed product 410 to detect that the printed product 410 is skewed. Although the first embodiment presents a configuration in which the inspection sensor 403 reads the shadow image at the edge of the printed product 410, any reading sensor other than the inspection sensor 403 may be used.

Figure 5:
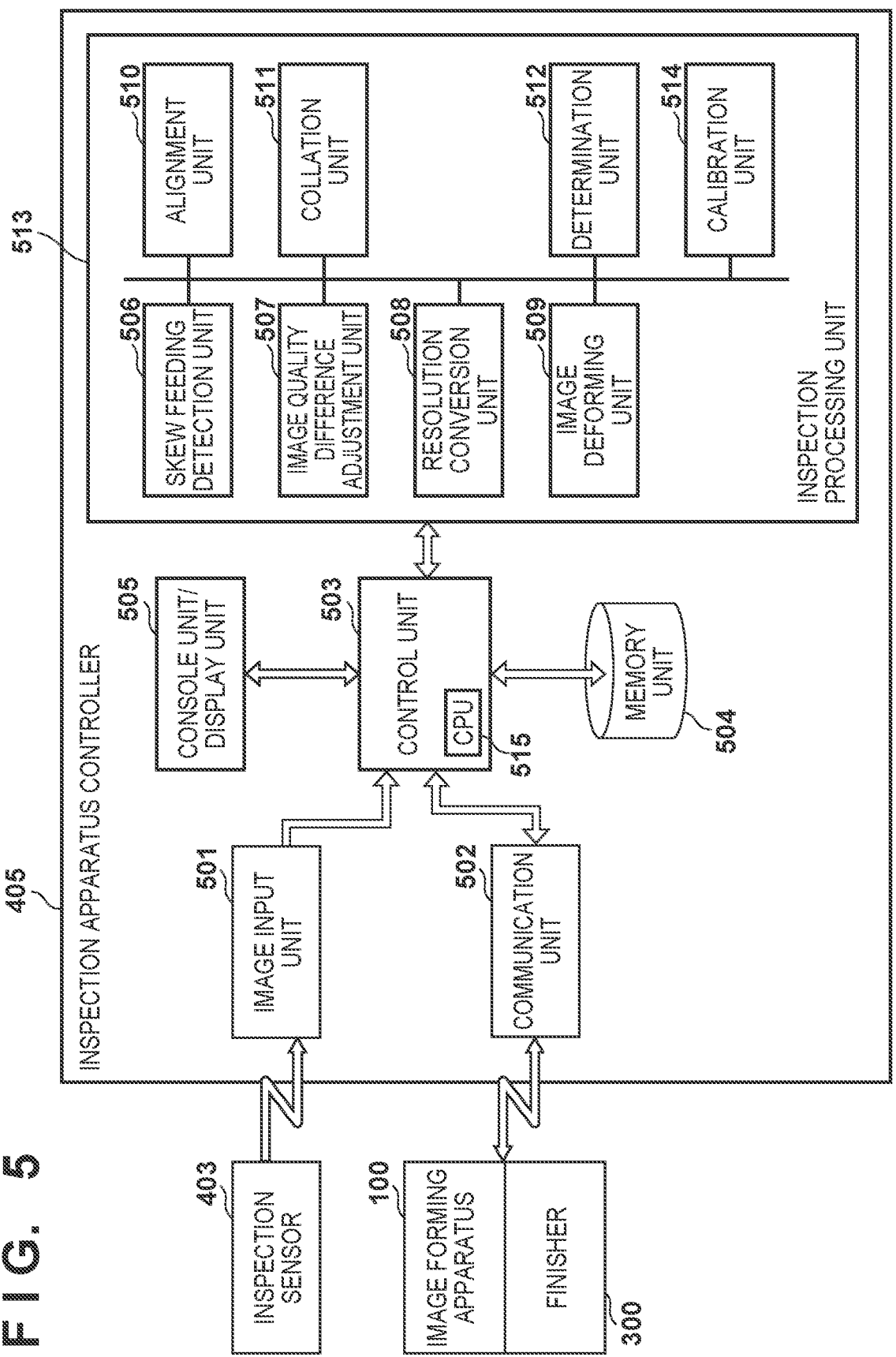
FIG. 5 is a block diagram explaining a configuration of an inspection apparatus controller of the inspection apparatus according to the first embodiment.

FIG. 5 is a block diagram explaining a configuration of the inspection apparatus controller 405 of the inspection apparatus 200 according to the first embodiment.

Control of the inspection apparatus controller 405 is performed entirely by a control unit 503. The control unit 503 includes a CPU 515, which executes a program deployed in a memory unit 504 to execute various processes described below. An image input unit 501 receives the scanned image obtained by the inspection sensor 403 that has read the printed product. The CPU 515 stores the received scanned image in the memory unit 504. In addition, a communication unit 502 communicates with the controller 21 of the image forming apparatus 100. The communication includes reception of image data (reference image) used for printing corresponding to the scanned image, and transmission and/or reception of inspection control information. The CPU 515 also stores the received reference image and the inspection control information in the memory unit 504.

One of the pieces of the inspection control information communicated to and from the image forming apparatus 100 is synchronization information for associating the scanned image (inspection image) with the reference image, such as print job information, number-of-prints information, and page order information. Other one of the pieces of the inspection control information includes inspection result information and control information for controlling the operation of the image forming apparatus 100 in conjunction with the inspection result information. The synchronization information is required to synchronize the reference image and the scanned image for double-sided printing or a printing of a plurality of copies, in a case where the order of scanned images received by the inspection apparatus 200 and the order of reference images used for printing the scanned images are different. In addition, a single reference image may be associated with a plurality of scanned images and therefore the synchronization information is required for synchronizing the reference image and the scanned image. The inspection control information exchanged between the inspection apparatus 200 and the finisher 300 is inspection result information and control information for controlling the operation of the finisher 300 in conjunction with the inspection result information.

An inspection processing unit 513 is controlled by the CPU 515 of the control unit 503. The inspection processing unit 513 obtains a pair of a scanned image and a reference image associated with each other, based on the synchronization information that is one of the pieces of inspection control information communicated to and from the image forming apparatus 100 described above, and sequentially performs the inspection processing. Details of the inspection processing unit 513 will be described below. Upon completion of the inspection processing, the determination result is sent to the control unit 503 and displayed on the console unit/display unit 505. When an image anomaly is determined to be exist as a result of the determination, controls of the image forming apparatus 100 and the finisher 300 are switched via the communication unit 502, in a manner preliminarily specified by the user via the console unit/display unit 505. For example, a process of terminating the image forming processing performed by the image forming apparatus 100 and switching the sheet discharge tray of the finisher 300 to an escape tray or the like is performed.

Next, a configuration of the inspection processing unit 513 will be described.

A skew feeding detection unit 506 is a module configured to detect a skew angle of the scanned image. As has been described above referring to FIG. 4B, the scanned image is scanned such that a shadow is formed at the edge of the printed product. This is for the inspection sensor 403 to scan the shadow at the edge of the printed product that is formed when the irradiation device 412 for skew feeding detection irradiates the printed product pulled into the inspection apparatus 200 and conveyed on the conveyance belt 402. Using the shadow, the skew angle of the printed product is detected. Correction processing is performed by an image deforming unit 509 described below, based on the detected skew angle.

An image quality difference adjustment unit 507 is a module configured to adjust an image difference between a scanned image and a reference image. The scanned image, which is image data obtained by scanning a printed reference image, may have an image difference from the reference image even when the scanned image has no image anomaly. The difference is caused by an effect of image processing before printing, an effect of characteristics of the image forming apparatus 100, and an effect of scanner characteristics, or the like. The image processing before printing includes color conversion processing, gamma processing, halftone processing, or the like. The characteristics of the image forming apparatus 100 include color reproducibility, dot gain, gamma characteristics, or the like. The scanner characteristics include color reproducibility, S/N, scanner MTF, or the like. In addition, the number of bits between images may be different. After such effects are eliminated and there is no image anomaly, then various processes are performed on both images or only on the reference images to remove the difference between the scanned image and the reference image. The various processes include color conversion processing, gamma correction processing, filtering processing (for descreening or adjusting edge rounding), and bit width adjustment. Furthermore, there are edge correction processing (thickening processing) and smoothing processing for matching the edge reproducibility of reference image and scanned image. Details of the edge correction processing will be described below in the calibration processing.

When performing the processes only on the reference image, an image equivalent to the scanned image is generated from the reference image by simulation, which is therefore equivalent to simulating the characteristics of the image forming apparatus 100 and the inspection sensor 403 in which no image anomaly has occurred.

A resolution conversion unit 508 is a module configured to convert the resolution of the scanned image or the reference image. The scanned image and the reference image may have different resolutions at the time when the scanned image and the reference image are input to the inspection apparatus controller 405. In addition, the resolution used in each module of the inspection processing unit 513 may be different from the resolution used in an input scanned image or an input reference image. In such a case, the resolution conversion unit 508 performs resolution conversion. For example, assume that a scanned image has a resolution of 600 dpi in main scan and 300 dpi in sub scan, and a reference image has a resolution of 1200 dpi in main scan and 1200 dpi in sub scan. When the resolution required by the inspection processing unit 513 is 300 dpi in both the main scan and the sub scan, respective image data are subjected to reduced scaling to render both images into 300 dpi image data in both the main scan and the sub scan. It suffices to use a known method as the method of scaling, taking into account the computational load and the required accuracy. For example, using the SINC function to perform scaling allows for obtaining the scaling result with a high accuracy, in exchange for a high calculation load. In addition, performing scaling using the nearest-neighbor algorithm results in scaling with a low accuracy, in exchange for a low calculation load.

The image deforming unit 509 is a module configured to deform the scanned image and the reference image. There exists geometric difference between the scanned image and the reference image, due to expansion and contraction or skewing of sheets during printing, skewing during scanning, or the like. The image deforming unit 509 corrects the geometric difference by deforming the image based on information acquired by the skew feeding detection unit 506 or an alignment unit 510 described below. For example, geometric difference is corrected by linear conversion (rotation, enlargement/reduction, shearing), parallel translation, or the like. The geometric difference can be expressed as an affine transform, and correction can be performed by obtaining an affine transform parameter from the skew feeding detection unit 506 or the alignment unit 510. Here, the information obtained from the skew feeding detection unit 506 is only parameters related to rotation (skew angle information).

The alignment unit 510 is a module configured to perform alignment between the scanned image and the reference image. The scanned image and the reference image input to the alignment unit 510 are assumed to be of the same resolution. Here, when the resolutions of the input scanned image and the input reference image are higher, the accuracy of alignment is improved, however the computational load becomes larger. Correcting the image by the image deforming unit 509 based on the parameters obtained during alignment, makes it possible to obtain the scanned image and the reference image to be used by a collation unit 511 described below. Although various alignment methods are conceivable for alignment, the present embodiment employs a method of performing alignment of the entire image using information of a partial region of the image instead of the entire image, in order to reduce the computational load. Alignment according to the embodiment includes three steps of selection of an alignment patch, alignment per patch, and estimation of an affine transform parameter. Each of the steps will be described below.

First, selection of an alignment patch will be described. Here, a "patch" refers to a rectangular region in an image. When selecting an alignment patch, a plurality of patches suitable for alignment are selected from a reference image. A patch suitable for alignment may be a patch having a large corner feature amount in the patch. A corner feature is a feature (intersection point of two edges) in which two outstanding edges oriented in different directions are existing at a vicinity of a certain local region. A corner feature amount is a feature amount representing the strength of the edge feature. Based on the difference of modeling the "edge feature", a variety of methods are proposed.

One of the methods for calculating the corner feature amount is a known method referred to as a corner detection method of Harris. The corner detection method of Harris calculates a corner feature amount image from a horizontal differential image (horizontal edge feature amount image) and a vertical differential image (vertical edge feature amount image). The corner feature amount image is an image representing the edge amount of the weaker one of two edges forming the corner feature. Both of two edges of the corner feature should be a strong edge, the size of the corner feature amount is represented whether or not the relatively weaker edge has a strong edge amount. A corner feature amount image is calculated from the reference image and a part having a large corner feature amount is selected as a patch that is suitable for alignment. When a region having a large corner feature amount is simply sequentially selected as a patch, the patch is selected only from a biased region. In such a case, the regions without existence of a patch on a periphery increases and the image deformation information of the regions can no longer be available, which is not a suitable state for aligning the entire image.

Therefore, in selecting a patch, it is considered that the patches are to be arranged in a distributed manner across the image, not just considering the size of the corner feature amount. Specifically, even when the corner feature amount of a certain patch candidate region is not large among those in the entire image, the patch is selected when it is relatively large in a local region of the image. Accordingly, it becomes possible to arrange by distributing patches across the reference image. The parameters for selecting a patch include the patch size, the number (or density) of patches, or the like. As the patch becomes larger and the number of patches increases, the accuracy of the alignment improves, in exchange for an increased computational load.

Next, a patch-by-patch alignment will be described. The patch-by-patch alignment aligns the patch for alignment in the reference image selected in the previous step and a patch in a scanned image corresponding to the patch in the reference image selected.

There are two types of information obtained as a result of alignment. The first one is the center coordinates (refpX_i, refpY_i) of the patch for alignment in the i-th reference image (i=1 to N: N is the number of patches). The second is a position (scanpX_i, scanpY_i) of its central coordinate in the scanned image. As for an alignment method, any alignment method may be used as long as it is a shift value estimation method that provides a relation between (refpX_i, refpY_i) and (scanpX_i, scanpY_i). For example, there is conceivable a method in which a patch for alignment and a patch corresponding to the patch for alignment are transferred onto the frequency space by using Fast Fourier Transform (FFT), and calculates the correlation between the two to estimate the shift value.

Finally, estimation of an affine transform parameter will be described. Affine transform is a coordinate transform method expressed by the equation illustrated in FIG. 14C.

In the equation, there are six types of the affine transform parameters: a, b, c, d, e and f. Here, (x, y) corresponds to (refpX_i, refpY_i), and (x', y') corresponds to (scanpX_i, scanpY_i). The affine transform parameters are estimated using the correspondence obtained from N patches. For example, it is possible to determine the affine transform parameters using the least square method. By deforming the reference image or the scanned image by the image deforming unit 509 based on the obtained affine transform parameters, an image subjected to alignment correction is formed, and then a set of reference images and scanned images to be used by the collation unit 511 is prepared.

The collation unit 511 is a module configured to collate the scanned image with the reference image. The scanned image and the reference image input to the collation unit 511 are image data of the same resolution. Here, this is based on the premise that the reference image or the scanned image is corrected by the image deforming unit 509 based on the information obtained by the alignment unit 510 to allow comparison of images. The collation unit 511 first generates a difference image between the reference image and the scanned image. The difference image is calculated by, for example:

difference image DIF (x, y)=DIS (reference image REF (x, y)-scan image SCAN (x, y). Here, (x, y) indicates the coordinates, and DIS ( ) is a function for calculating the distance between pixel values. DIS ( ) for a grayscale image may be the absolute value of the simple difference, or may be a function for calculating the absolute value of the difference considering gamma. DIS ( ) for a color image, it suffices to use a function for calculating the color difference.

Next, a corrected difference image is obtained by setting zero to pixel values in a region having pixel values not exceeding a certain constant value in the obtained difference image. This is because pixels with values not exceeding a certain constant pixel value in the difference image are considered to be within an acceptable difference and thus are not categorized as an image anomaly. Next, non-zero-pixel-value regions in the image are concatenated, and a pixel group surrounded by zero-pixel-value regions is defined as a pixel block. Subsequently, an image feature value is determined for each of all the pixel blocks in the image. Examples of image feature values include, for example, average difference value and area. In addition, a variance value or the like may be calculated. The image feature values are used by a determination unit 512. An output from the collation unit 511 includes the corrected difference image and information about pixel blocks (position and image feature value of each pixel block).

The determination unit 512 is a module configured to determine the presence or absence of an image anomaly from the collation result generated by the collation unit 511. An input to the module includes the corrected difference image, the position information of the pixel block, and the image feature value which is output from the collation unit 511. The image feature value is evaluated for each pixel block to determine whether or not its pixel block is an image anomaly. For example, in a case where the image feature value is an area and an average difference value, presence or absence of an image anomaly is determined based on a determination criterion illustrated in FIG. 12A.

Figure 12A:
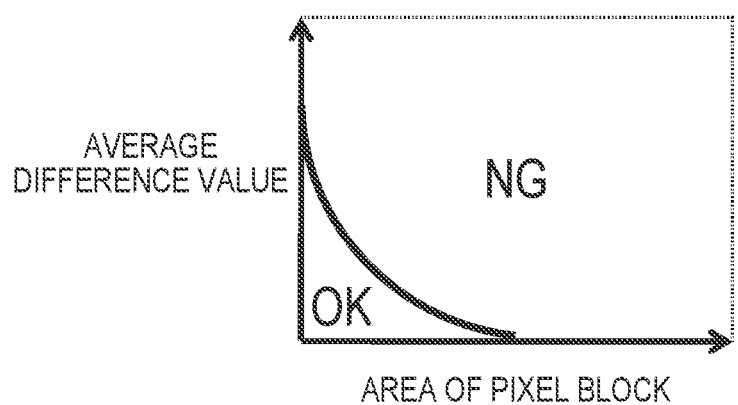
FIG. 12A is a diagram illustrating a determination criterion for determining an image anomaly in a case where the image feature value is an area and an average difference value.

FIG. 12A is a diagram illustrating a determination criterion for determining an image anomaly in a case where the image feature value is an area and an average difference value.

In FIG. 12A, the horizontal axis indicates the area of the pixel block and the vertical axis indicates the average difference value of the pixel block, and a region marked OK (OK region) is a region without any image anomaly, whereas a region marked NG is a region regarded as including an image anomaly. A line segment parameter separating the OK region and the NG region is set in the determination unit 512 by the control unit 503. When there are three or more image feature values to be determined, the control unit 503 sets, to the determination unit 512, a plane parameter (or a parameter of a hyperplane of (image feature value dimension—one dimension)) discriminating between the NG region and other regions in a feature space defined by image feature values. As a result of the determination, a value of zero is set to pixel values in the corrected difference image of a pixel block in a region of pixel blocks not regarded as an image anomaly. And after the processing on all the pixel blocks has been completed, an image, in which only the regions regarded as an image anomaly have non-zero values, is provided as the determination result image. And then, the output from the collation unit 511 is the information about the determination result image and pixel blocks remaining on the determination result image.

A calibration unit 514 determines an edge correction parameter to be used in the edge correction processing performed by an image quality difference adjustment unit 507 in order to match the edge reproducibility of the RIP data (reference image) and the scanned image (inspection target image). The edge correction parameter is determined based on the reference image used to print a calibration chart, which will be described below, and the scanned image formed by the image input unit 501 that has read the calibration chart. Details of the calibration processing will be described below.

Next, the calibration chart will be described, referring to FIGS. 10A to 10C.

Figures 10A, 10B:
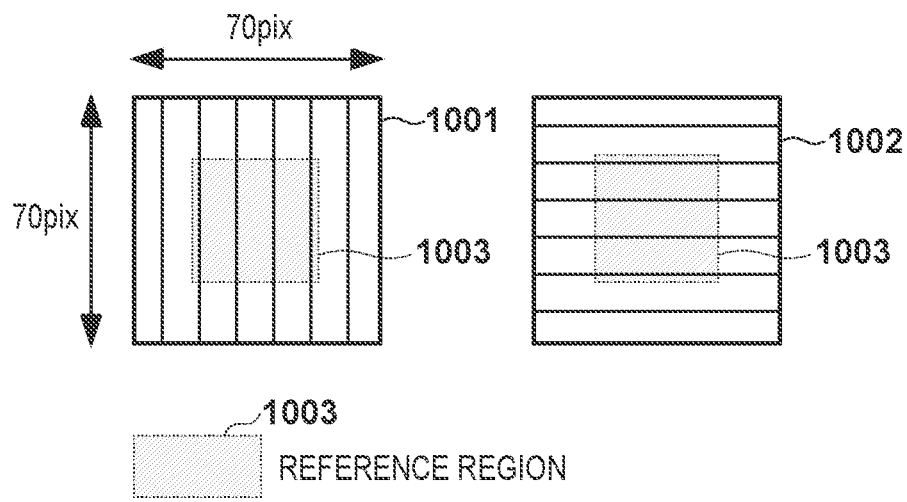
FIGS. 10A to 10C are diagrams illustrating an example of patches included in a calibration chart and the calibration chart, according to the first embodiment.
Figure 10C:
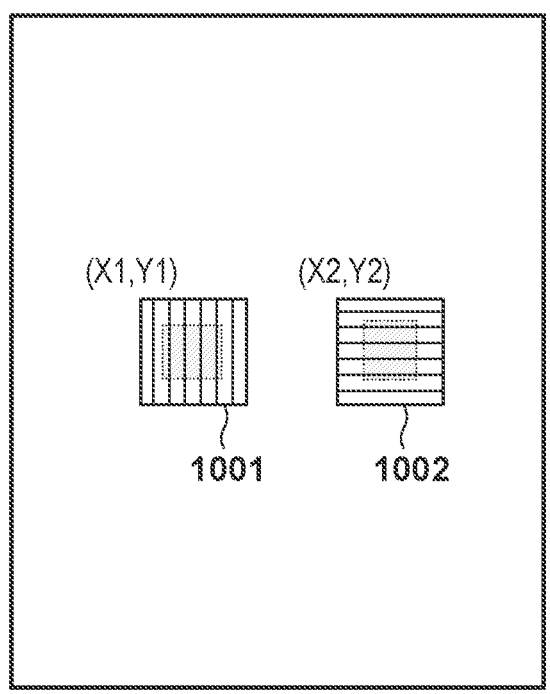

FIGS. 10A to 10C are diagrams illustrating an example of patches included in a calibration chart and the calibration chart, according to the first embodiment.

The calibration chart is formed of patches of vertical or horizontal lines in order to match the edge reproducibility of the RIP data (reference image) and the scanned image (inspection target image).

FIG. 10A illustrates a vertical line patch 1001, with the patch size being 70×70 pix (pixels). In addition, the ratio of black lines and blank in the patch is 1 to 7, i.e., 1 dot and 7 spaces. Here, the patch size and the ratio of black line and space (blank) are not limited thereto. For example, the patch size may be changed according to the sheet size. In addition, the ratio of black lines and blank may be 2 to 6, i.e., 2 dots and 6 spaces. In addition, not all the regions in a patch are used. and the range actually used is assumed to be the region 1003 at the center of the patch, which is shown in gray in the figure.

FIG. 10B illustrates a horizontal line patch 1002. The size and shape of the horizontal line patch 1002 are similar to those of the vertical line patch 1001 of FIG. 10A.

FIG. 10C is a diagram illustrating a calibration chart having arranged therein the vertical line patch 1001 of FIG. 10A and the horizontal line patch 1002 of FIG. 10B.

It is assumed in the first embodiment that the sheet size of the chart is A4, the number of patches are one vertical line patch and one horizontal line patch, the upper left coordinates of the vertical line patch 1001 is (X1, Y1), and the upper left coordinates of the horizontal line patch 1002 is (X2, Y2). Here, the numbers of vertical and horizontal line patches, and the positions at which they are arranged are not limited thereto. For example, vertical line patches of different ratios of black lines and blank may be respectively arranged.

In addition, although the vertical line patch 1001 and the horizontal line patch 1002 are provided substantially at the center of the chart in FIG. 10C, they may be located at the edge of the chart. Additionally or alternatively, a color patch for performing color correction may be provided using marginal space.

Next, a UI screen of the calibration processing will be described, referring to FIG. 12B. The user uses the console unit/display unit 505 to perform calibration setting, calibration execution, and inspection execution according to the first embodiment.

Figure 12B:
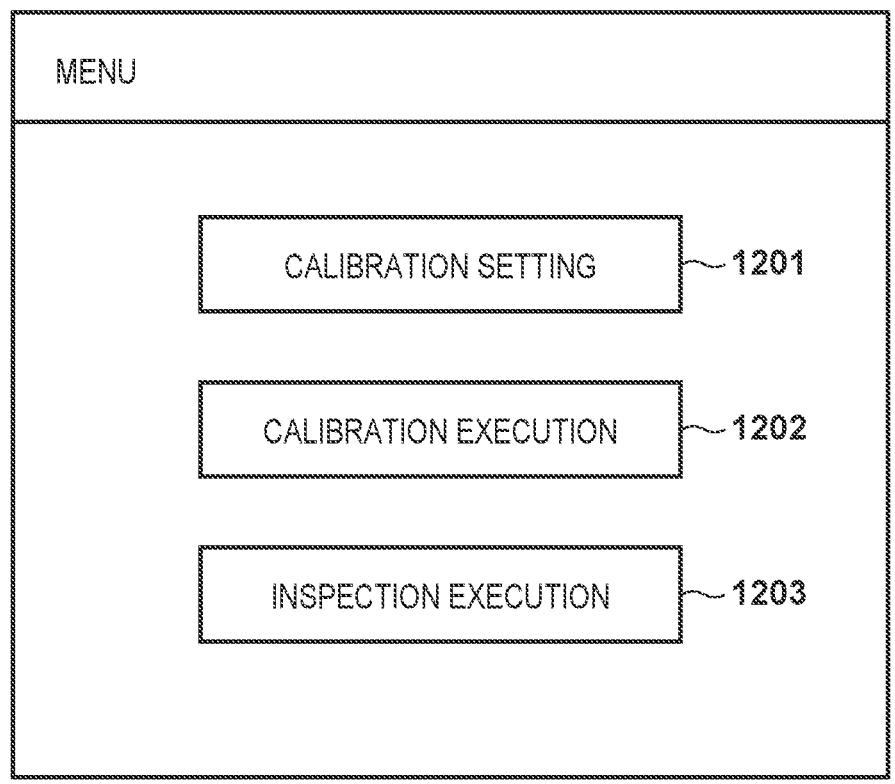
FIG. 12B is a diagram illustrating an example of a menu screen for specifying calibration setting, calibration execution, and inspection execution, which are displayed on a console unit/display unit of the inspection apparatus according to embodiments.

FIG. 12B is a diagram illustrating an example of a menu screen for instructing calibration setting, calibration execution, and inspection execution, which are displayed on the console unit/display unit 505.

Pressing a calibration setting button 1201 causes a transition to a calibration setting screen illustrated in FIG. 13A. Alternatively, pressing a calibration execution button 1202 starts execution of calibration. Still alternatively, pressing an inspection execution button 1203 starts execution of inspection.

FIG. 13A is a diagram illustrating an example of a calibration setting screen on which a user selects calibration data to select a desired type of calibration to be executed.

The user either selects calibration data to be used from a preliminarily registered list, based on conditions such as a sheet size or a paper type, or newly registers the calibration data when the calibration data to be used is not registered in the list. Here, the difference of edge reproducibility between the reference image and the scanned image, which is the theme of the present invention, varies depending on the sheet size or the paper type and therefore the sheet size and the paper type is listed as an item of calibration settings, but calibration settings are not limited thereto. For example, information such as a weight of paper may be used. Note that the image data included in the calibration data is assumed to be the aforementioned data illustrated in FIG. 10C.

Pressing a new registration button 1301 on the calibration setting screen causes a transition to a calibration registration screen illustrated in FIG. 13B. Pressing a deletion button 1302 deletes the calibration data selected in the list. Pressing an OK button 1303 can make the calibration data selected in the list to be applied in execution of calibration. In other words, calibration can be executed using the selected calibration data. FIG. 13A illustrates a situation where "calibration data 1" is selected. Pressing a cancel button 1304 causes a transition back to the screen illustrated in FIG. 12B.

FIG. 13B is a diagram illustrating an example of a calibration registration screen for newly registering calibration data.

The user inputs an arbitrary name for the calibration data to be registered, selects a sheet size and a paper type, and presses an OK button 1305. As such, calibration data can be newly registered. In the example of FIG. 13B, calibration data is set as the name of "calibration data 3", the sheet size being A4, and the paper type being "thick paper". Pressing a cancel button 1306 causes a transition to the screen illustrated in FIG. 13A without registering the calibration data.

In the following, there will be described calibration processing according to the first embodiment, referring to FIGS. 6 to 10A to 10C, FIGS. 12A and 12B, and FIGS. 13A and 13B. It is assumed here that the calibration processing is executed before the inspection processing. Here, the calibration processing may be automatically executed each time before the inspection processing, or may be executed each time an instruction is issued from the user in calibration processing for the inspection processing, as described above referring to FIG. 12B. Furthermore, the present invention is not limited thereto, for example, the calibration processing according to the embodiment may be performed using the UI unit 23 of the image forming apparatus 100 in general calibration processing, other than inspection, for adjusting a color tint.

Figure 7:
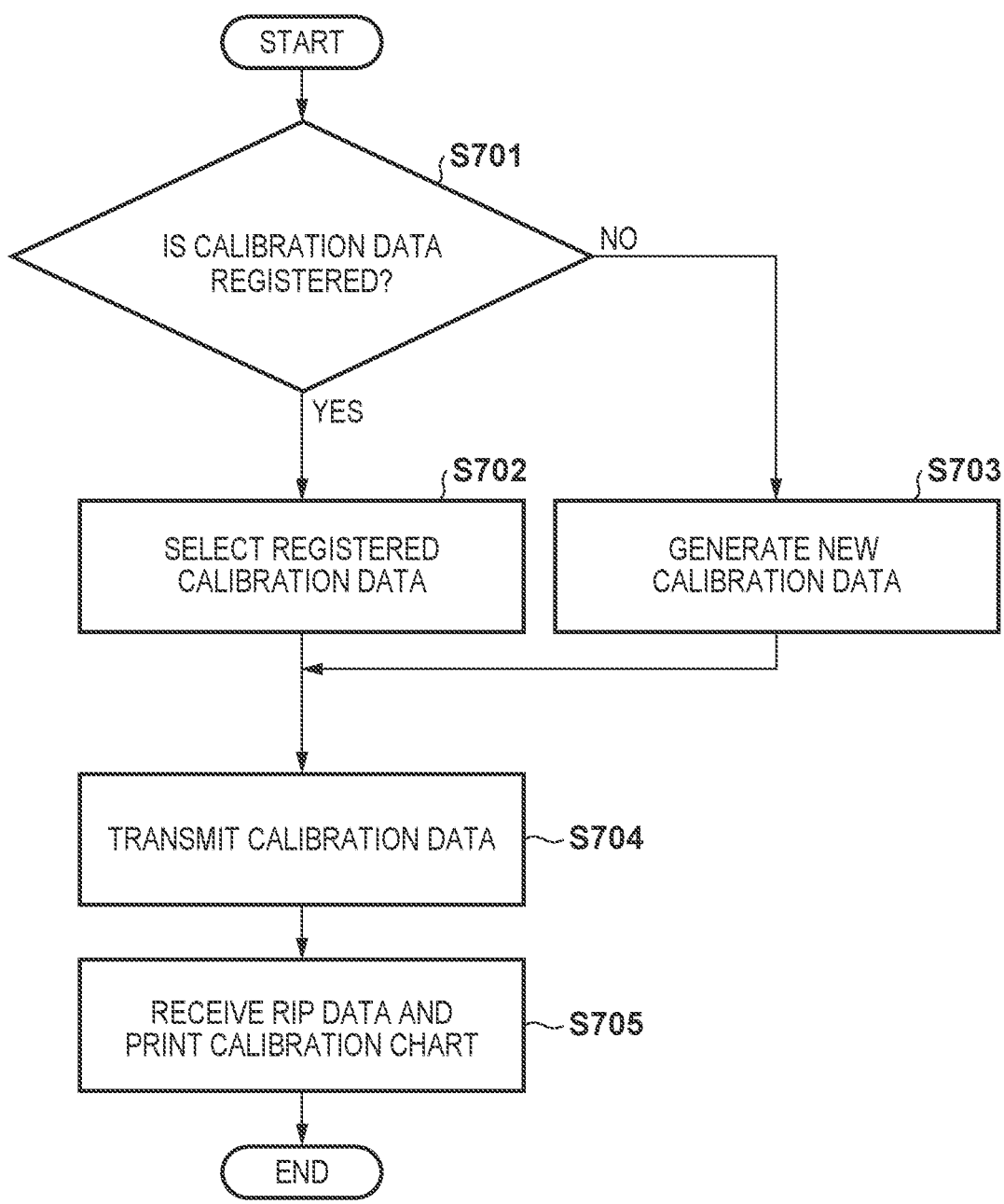
FIG. 7 is a flowchart explaining a process from generating calibration data to printing a calibration chart performed by the inspection apparatus according to the first embodiment.

FIG. 7 is a flowchart explaining a process from generating calibration data to printing a calibration chart performed by the inspection apparatus 200 according to the first embodiment. Here, the process described by the flowchart is realized by the CPU 515 of the control unit 503 executing a program deployed on the memory unit 504. The process described by the flowchart is started when the inspection execution button 1203 on the menu screen illustrated in FIG. 12B is pressed.

First, in step S701, the CPU 515 determines whether any calibration data is already registered. When some calibration data is already registered, the processing proceeds to step S702 and the CPU 515 selects registered calibration data, then the processing proceeds to step S704. When, on the other hand, no calibration data is registered, the processing proceeds to step S703 and the CPU 515 generates new calibration data in response to the user's operation, then the processing proceeds to step S704.

In step S704, the CPU 515 transmits the calibration data selected in step S702 or the calibration data newly generated in step S703 to the image forming apparatus 100, whereby the image forming apparatus 100 generates RIP data from the calibration data in the image processing unit 105. Next, the processing proceeds to step S705 and the CPU 515 receives the RIP data, and then, according to the RIP data, performs printing using the printer unit 206 of the image forming apparatus 100. The sheet thus printed is the aforementioned calibration chart. Here, it is assumed that the calibration chart as illustrated in FIG. 10C is printed.

Figure 8:
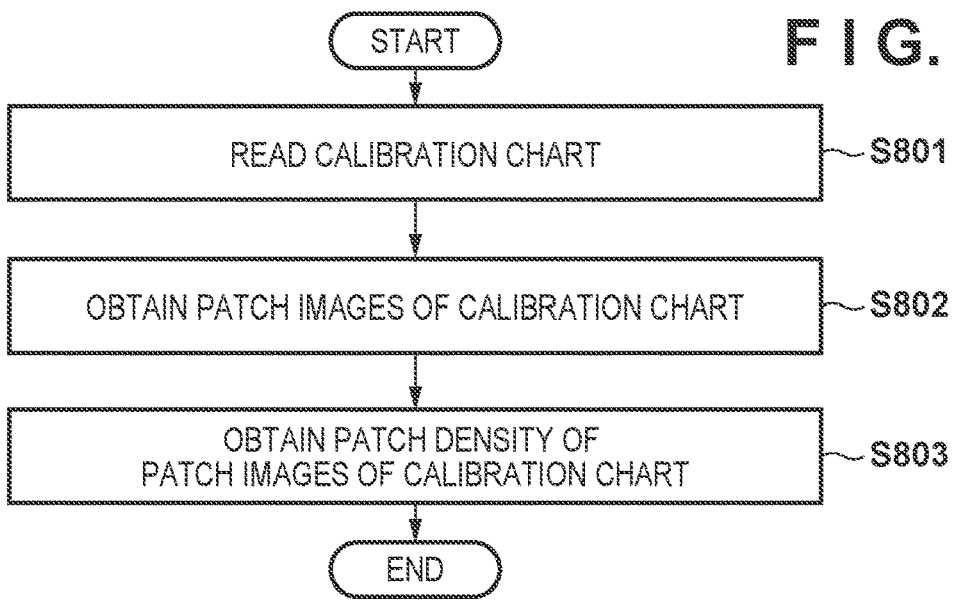
FIG. 8 is a flowchart explaining a process of reading the calibration chart and obtaining a patch density from a scanned image performed by the inspection apparatus according to the first embodiment.

FIG. 8 is a flowchart explaining a process of reading the calibration chart and obtaining a patch density from a scanned image performed by the inspection apparatus 200 according to the first embodiment. Here, the process described by the flowchart is realized by the CPU 515 of the control unit 503 executing a program deployed on the memory unit 504.

First, in step S801, the CPU 515 controls the image input unit 501 to read the calibration chart. Next, the processing proceeds to step S802 and the CPU 515 obtains patch images of a vertical line patch and a horizontal line patch from the scanned image of the calibration chart. Obtainment of the patch images is performed based on the position coordinates where the vertical line patch 1001 and the horizontal line patch 1002 are arranged, as illustrated in FIG. 10C described above. Subsequently, the processing proceeds to step S803 and the CPU 515 obtains patch density from the patch images obtained in step S802. Here, the patch density is assumed to be the average density in the reference region 1003 illustrated in FIGS. 10A and 10B described above.

Figure 11A:
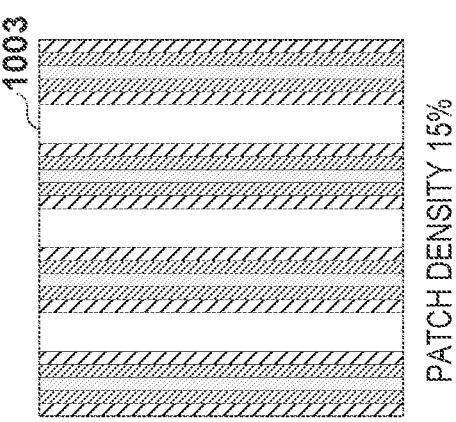
FIG. 11A is an enlarged schematic diagram of a reference region of a patch image obtained in step S802 of FIG. 8.

FIG. 11A is an enlarged schematic diagram of the reference region 1003 of the patch image 1001 obtained by reading the calibration chart in step S802.

FIG. 11A illustrates that the reference region 1003 includes four vertical lines, in which each fine line is blurred and thickened due to the effect of reading. Here, the patch density in FIG. 11A is assumed to be 15%.

Figure 9:
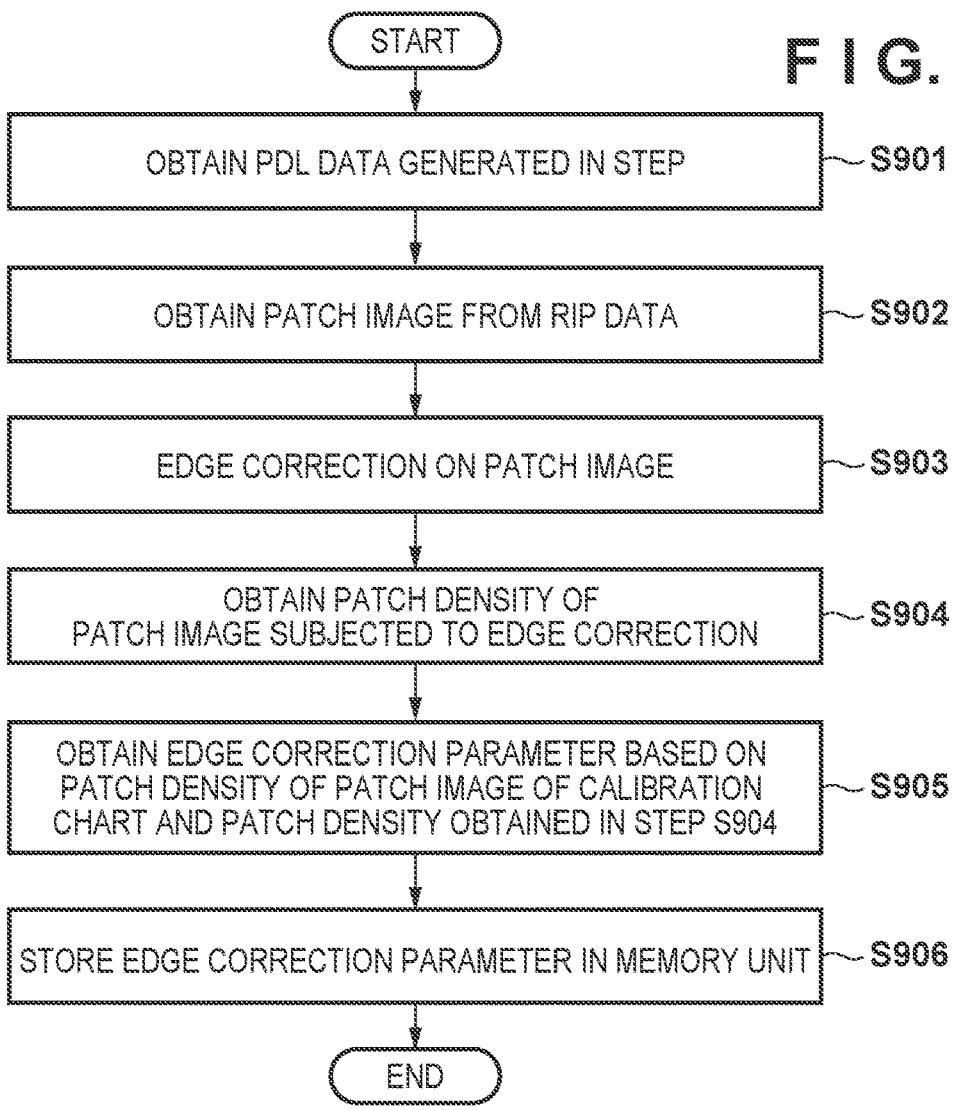
FIG. 9 is a flowchart explaining a process of determining an edge correction parameter performed by the inspection apparatus according to the first embodiment.

FIG. 9 is a flowchart explaining a process of determining an edge correction parameter performed by the inspection apparatus 200 according to the first embodiment. Here, the process described by the flowchart is realized by the CPU 515 of the control unit 503 executing a program deployed on the memory unit 504.

First, in step S901, the CPU 515 obtains the RIP data obtained from the image forming apparatus 100 in step S705. Next, the processing proceeds to step S902 and the CPU 515 obtains a patch image of a vertical line patch or a horizontal line patch, from the obtained RIP data. Obtainment of the patch images is performed based on the position coordinates where the vertical line patch 1001 and the horizontal line patch 1002 are arranged, as illustrated in FIG. 10C described above.

Figure 11B:
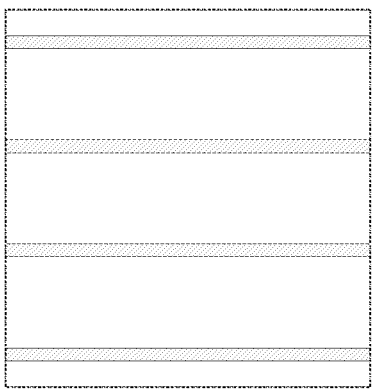
FIG. 11B is an enlarged schematic diagram of a reference region of the patch image obtained from the RIP data.

FIG. 11B is an enlarged schematic diagram of a reference region of the patch image obtained in step S902. Here, the patch image is obtained from the RIP data and therefore each fine line thereof is formed in one pixel width.

Next, the processing proceeds to step S903 and the CPU 515 causes the calibration unit 514 to perform edge correction on the patch image obtained in step S902. The edge correction is a correction in which thickening processing is gradually performed on the fine lines and subsequently smoothing processing is performed on each of the fine lines. Here, the parameters used for edge correction are referred to as edge correction parameter 1, edge correction parameter 2, and edge correction parameter N, in ascending order from the finest line. In addition, the smoothing processing is assumed to be a fixed process.

For the edge correction parameter 1, for example, only the smoothing processing is performed without thickening processing. For the edge correction parameter 2, the smoothing processing is performed on the result of thickening processing in one level. For the edge correction parameter 3, the smoothing processing is performed on the result of thickening processing in two levels. In a similar manner, thereafter, the smoothing processing is performed on the result of thickening processing in (N−1) levels for the edge correction parameter N.

Here, it suffices to employ a known method of thickening a fine line. For example, there is a method of thickening a fine line by performing first smoothing processing on the entire patch image and subsequently performing a first edge enhancement. Performing smoothing processing on the entire patch image blurs the edge portion of a fine line, and therefore, after the smoothing processing, performing edge enhancement can thicken the fine line. In addition, performing more powerful second smoothing processing further blurs the edge portion of the fine line, and therefore, after the second smoothing processing, performing a more powerful second edge enhancement can further thicken the fine line. Since the aforementioned method processes the entire image, there is no need of attribute information and edge detection. Another method of thickening a fine line may be, for example, a method of detecting an edge of a fine line in a patch image and subsequently simply thickening the edge portion by a two-pixel width, a three-pixel width, . . . , an n-pixel width, and so on.

FIG. 15B illustrates relations between the edge correction parameters according to the first embodiment, the thickening processing, and the smoothing processing. In FIG. 15B, only the smoothing processing is executed without thickening processing, for a case of the edge correction parameter 1. The amount of thickening the fine line is subsequently increased in ascending order from the edge correction parameter 2.

Figure 11C:
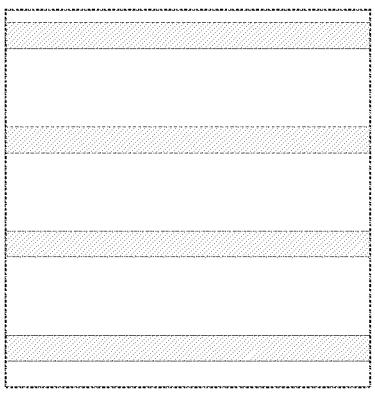
FIGS. 11C and 11D are diagrams illustrating the result of thickening the patch image of FIG. 11B in a stepwise manner using an edge correction parameter 2.
Figure 11D:
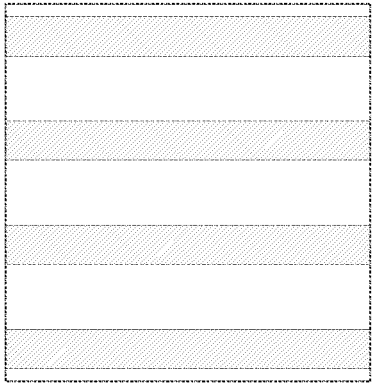

FIG. 11C illustrates the result of thickening the fine line in one level to FIG. 11B using the edge correction parameter 2, and FIG. 11D illustrates the result of thickening the fine line in two levels to FIG. 11B using the edge correction parameter 3.

Figure 11E:
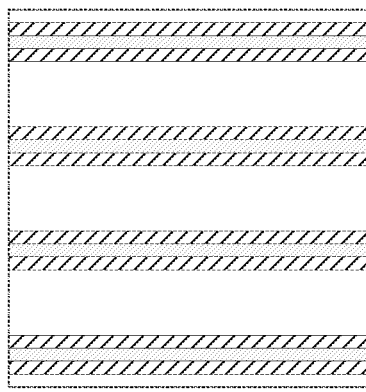
FIGS. 11E to 11G are diagrams illustrating the result of smoothing processing on the patch images of FIGS. 11B to 11D.
Figure 11F:
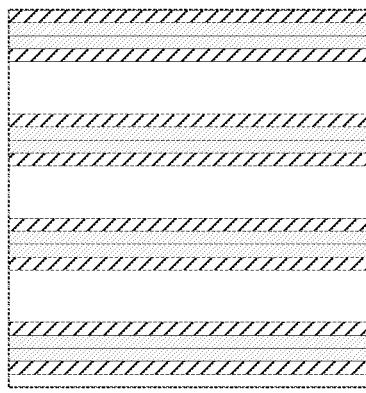
Figure 11G:
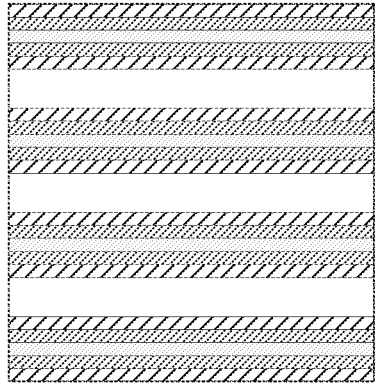

In addition, FIGS. 11E to 11G illustrate the results of performing the smoothing processing respectively on FIGS. 11B to 11D. It suffices to use any known method such as for example smoothing filtering for the smoothing processing.

Next, the processing proceeds to step S904 and the CPU 515 causes the calibration unit 514 to obtain the patch density from the patch image subjected to the edge correction in step S903. Here, the patch density is assumed to be 5% for the edge correction parameter 1 as illustrated in FIG. 11E, 10% for the edge correction parameter 2 as illustrated in FIG. 11F, and 16% for the edge correction parameter 3 as illustrated in FIG. 11G.

Next, the processing proceeds to step S905 and the CPU 515 causes the calibration unit 514 to obtain the edge correction parameter based on the density of the patch image obtained by reading the calibration chart in step S803, and the density of the patch image subjected to edge correction with respect to the RIP data in step S904. Specifically, an edge correction parameter is obtained with which the density difference with respect to the patch image obtained in step S803 is the minimum value (or a value exceeds the density for the first time).

In the examples of FIGS. 11A to 11G, for example, the patch density indicated in FIG. 11A corresponding to the density of the patch image obtained in step S803 is 15%, and therefore the value closest thereto in FIGS. 11E to 11G is the patch density of 16% in FIG. 11G. Accordingly, the edge correction parameter 3 corresponding to FIG. 11G is obtained as the edge correction parameter.

Next, the processing proceeds to step S906 and the CPU 515 stores the edge correction parameter obtained in step S905 in the memory unit 504, and terminates the process. In step S906, the edge correction parameter is stored in association with the calibration data and the sheet size and the paper type. It is assumed that an edge correction parameter appropriate for conditions of the sheet size and the paper type is applied in the pre-processing (edge correction processing) of the inspection processing described below. For example, when the edge correction parameters are stored as illustrated in FIG. 15C, the edge correction parameter 3 is to be applied in the pre-processing (edge correction processing) of the inspection processing, for the condition in which the sheet size is A4 size and the paper type of the sheet is thick paper.

As such, applying the edge correction parameter to the RIP data (reference image) allows for matching the edge reproducibility between the RIP data (reference image) and the scanned image.

Next, the inspection processing performed by the inspection apparatus 200 according to the first embodiment will be described, referring to the flowchart of FIG. 6. Here, the inspection processing is assumed to be executed after the aforementioned calibration processing is performed.

Figure 6:
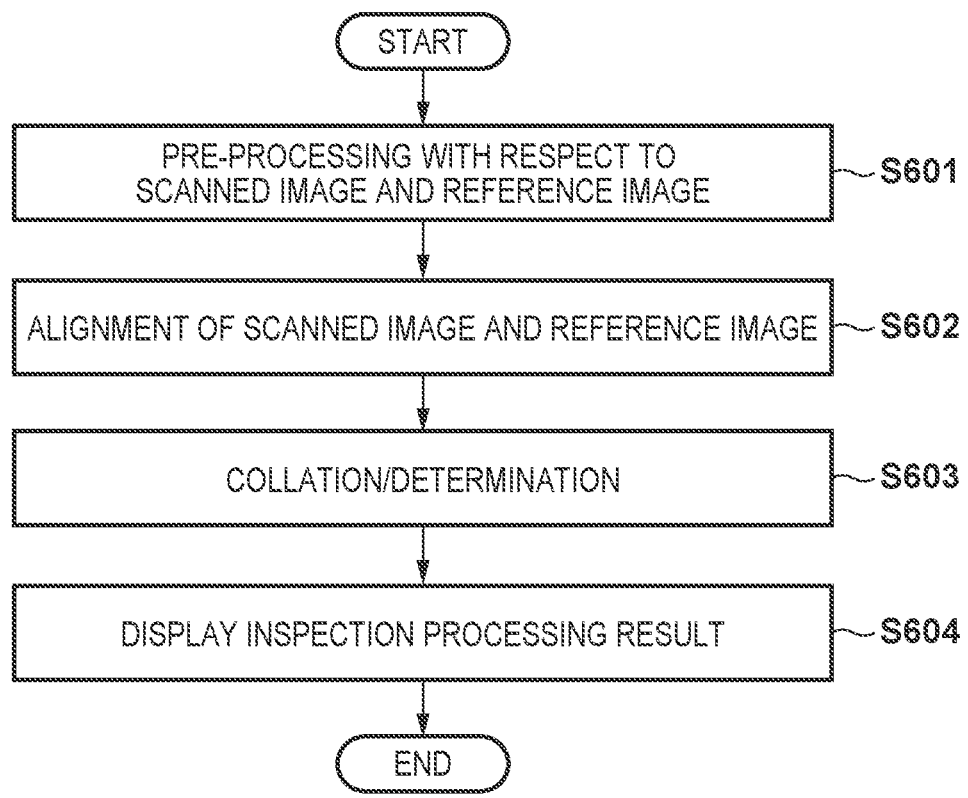
FIG. 6 is a flowchart explaining inspection processing performed by the inspection apparatus according to the first embodiment.

FIG. 6 is a flowchart explaining the inspection processing in inspection performed by the inspection apparatus 200 according to the first embodiment. Here, the process described by the flowchart is realized by the CPU 515 of the control unit 503 executing a program deployed on the memory unit 504. Here, the result of processing of the flowchart is stored in the memory unit 504 and used in subsequent processing.

First, in step S601, the CPU 515 performs pre-processing of the inspection processing. At this time, the CPU 515 selects an image pair of a scanned image to be inspected and a reference image, using the inspection control information stored in the memory unit 504 and received from the image forming apparatus 100 via the communication unit 502. The CPU 515 then causes the skew feeding detection unit 506 to process the scanned image and obtains skew information of the scanned image. Then, the image deforming unit 509 performs the correction processing on the scanned image, based on the skew information. In parallel with the foregoing, the image quality difference adjustment unit 507 processes and renders the reference image into an image suitable for the inspection processing as has been described above. Here, the edge correction processing is performed on the RIP data (reference image) using the edge correction parameters obtained in the aforementioned calibration processing.

For example, since the edge correction parameter 3 is obtained as the edge correction parameter in the first embodiment, the image quality difference adjustment unit 507 performs the smoothing processing on the fine line that is thickened in two levels. Accordingly, it is possible to match the reproducibility of the edge of the RIP data (reference image) to that of the edge of the scanned image. When a plurality of edge correction parameters are stored in association with the calibration data as illustrated in FIG. 15C, for example, an edge correction parameter is selected in accordance with the size and the type of the sheet to be inspected, and applied to pre-processing (edge correction processing) of the inspection processing.

Next, the processing proceeds to step S602 and the CPU 515 performs alignment using the scanned image and the reference image obtained in step S601. At this time, the CPU 515 first causes the resolution conversion unit 508 to convert the scanned image and the reference image into images of a predetermined resolution (e.g., 300 dpi×300 dpi). The CPU 515 then causes the alignment unit 510 to process the scanned image and the reference image, which have been converted into images of a predetermined resolution, and obtains affine transform parameters. Finally, the CPU 515 causes the image deforming unit 509 to perform the correction processing on the reference image to make a coordinate system of the reference image to be same with that of the scanned image, using the affine transform parameter obtained from the alignment unit 510, and obtains an image that can be used for collation.

Subsequently, the processing proceeds to step S603 and the CPU 515 performs collation and determination processing using the scanned image and the reference image obtained in step S602. The CPU 515 first causes the collation unit 511 to process the scanned image and the reference image. The CPU 515 then causes the determination unit 512 to perform determination processing, using the result of collation performed by the collation unit 511. Processing by the determination unit 512 is performed by setting, to the determination unit 512 by the CPU 515, a predetermined determination criterion which is preliminarily set via the console unit/display unit 505.

The processing then proceeds to step S604 and the CPU 515 displays the inspection processing result on the console unit/display unit 505. At this time, simply displaying an image of the final determination result makes it difficult to grasp the type of image anomaly when an image anomaly occurs, and therefore an image of the final determination result is synthesized with the scanned image and displayed on the console unit/display unit 505. As for the synthetic method, any synthetic method may be used for synthesizing as long as it facilitates grasping the location of the image anomaly. For example, as an image of the final determination result, a difference location is displayed in red color in the scanned image.

According to the first embodiment as has been described above, matching the edge reproducibility between the RIP data (reference image) and the scanned image (inspection target image) allows for reducing over-detection.

Here, the first embodiment has been described such that the edge correction parameter is obtained by gradually performing thickening processing and smoothing processing on the RIP data (reference image) to match with the edge reproducibility of the scanned image. Conversely, however, the edge correction parameter may be obtained by gradually performing enhancement processing on the scanned image to match with the edge reproducibility of the RIP data (reference image). However, there is a limit in the enhancement processing on the scanned image in that no such fine line will be obtained as with the RIP data (reference image), and therefore it is conceivable to use both edge correction parameters for the scanned image and the RIP data (reference image) simultaneously.

Second Exemplary Embodiment

The aforementioned first embodiment has been described such that the edge correction parameter is obtained by gradually performing thickening processing and smoothing processing of the RIP data (reference image) to match with the patch density of the scanned image.

In contrast, in a second embodiment, there will be described a method that preliminarily obtains a Modulated Transfer Function (MTF) of the scanned image and selects filtering processing for the RIP data in accordance with the MFT. The aforementioned method allows for omitting the gradual thickening processing, smoothing processing, and patch density acquisition with respect to the RIP data, and replacing them by single filtering processing.

In the following, the second embodiment will be described, referring to FIGS. 14A and 14B, and 15A. In the second embodiment, description for components, processes, and drawings that are similar to those of the first embodiment will be omitted.

FIGS. 14A and 14B are enlarged schematic diagrams of a reference region of a patch image obtained by scanning, in step S802 of the first embodiment. In addition, FIG. 15A is a diagram illustrating frequency characteristics of a filter preliminarily stored in the memory unit 504. Filter 1 is a filter for attenuation to 80%, and filter 2 is a filter for attenuation to 60%.

FIG. 14A is a diagram illustrating an example of a patch image obtained under a condition of an A4 size and a normal paper.

Here, it is indicated that an average density at the center part of a fine line is 90%, and the average density at the edge of the fine line is 10%. Here, the MTF is 80% (=90−10) and thus, under this condition, the filter 1, illustrated in FIG. 15A, is selected which has attenuation amount corresponding to the MTF is 80%.

FIG. 14B illustrates an example of a patch image obtained under a condition of an A4 size and a thick paper. Here, it is indicated that the average density at the center part of the fine line is 70%, and the average density at the edge of the fine line is 10%. Here, the MTF is 60% (=70−10) and thus, under this condition, the filter 2, illustrated in FIG. 15A, is selected which has attenuation amount corresponding to the MTF is 60%.

The filter thus selected is used in filtering processing for the RIP data (reference image) in the edge correction processing by the image quality difference adjustment unit 507, similarly to the first embodiment.

There are four fine lines in the reference regions of FIGS. 14A and 14B, and therefore the density at the center part of the fine lines and the density at the edge of the fine lines may be the average over the four fine lines.

As has been described above, the second embodiment preliminarily obtains an MTF of the scanned image, and selects filtering processing for the RIP data in accordance with the MTF. The foregoing allows for matching the edge reproducibility between the RIP data (reference image) and the scanned image (inspection target image) by simple processing.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-10361, filed Jan. 26, 2022, which is hereby incorporated by reference herein in its entirety.

What is claimed is:

1. An inspection apparatus for inspecting image data obtained by reading a sheet using a reference image of the image data, the inspection apparatus comprising:
one or more controllers including one or more processors and one or more memories, the one or more controllers being configured to:
obtain first image data by reading a sheet having lines printed thereon,
obtain second image data from print data of the lines
perform edge correction on the lines included in the second image data by applying a plurality of edge correction parameters being different from each other,
determine an edge correction parameter of the plurality of edge correction parameters that minimizes a difference between a density of the second image data subjected to the edge correction and a density of the first image data;
perform an edge correction on the reference image using the determined edge correction parameter; and
inspect image data obtained by reading a sheet of an inspection target using the reference image on which the edge correction has been performed.

2. The inspection apparatus according to claim 1, wherein the lines include a fine line,
the edge correction parameter includes settings related to processing of thickening the fine line and smoothing processing, and
the density of the second image data and the density of the first image data each are average density over a reference region including a plurality of the fine lines in the lines.

3. The inspection apparatus according to claim 2, wherein the fine lines include a plurality of vertical lines and horizontal lines.

4. The inspection apparatus according to claim 1, wherein the one or more controllers are further configured to:
register calibration data for printing the lines, and
select registered calibration data and cause a printing apparatus to print the selected calibration data,
wherein the sheet having the lines printed thereon is printed by the printing apparatus.

5. The inspection apparatus according to claim 4, wherein the calibration data includes image data of lines, and size and type of the sheet.

6. The inspection apparatus according to claim 4, wherein, the one or more controllers are configured to further store calibration data used to print the lines and the edge correction parameter being obtained, in association with each other.

7. A method of controlling an inspection apparatus for inspecting image data obtained by reading a sheet, using a reference image of the image data, the method comprising:
obtaining first image data by reading a sheet having lines printed thereon;
obtaining second image data from print data of the lines;
performing edge correction on the lines included in the second image data by applying a plurality of edge correction parameters being different from each other;
determining an edge correction parameter of the plurality of edge correction parameters that minimizes a difference between a density of the second image data subjected to edge correction and a density of the first image data;
performing an edge correction on the reference image using the determined edge correction parameter; and
inspecting image data obtained by reading a sheet of an inspection target using the reference image on which the edge correction has been performed.

8. A non-transitory computer-readable storage medium storing a program for causing a processor to execute a method of controlling an inspection apparatus for inspecting image data obtained by reading a sheet using a reference image of the image data, the method comprising:
obtaining first image data by reading a sheet having lines printed thereon;
obtaining second image data from print data of the lines;
performing edge correction on the lines included in the second image data by applying a plurality of edge correction parameters being different from each other;
determining an edge correction parameter of the plurality of edge correction parameters that minimizes a difference between a density of the second image data subjected to edge correction and a density of the first image data;
performing an edge correction on the reference image using the determined edge correction parameter; and
inspecting image data obtained by reading a sheet of an inspection target using the reference image on which the edge correction has been performed.

* * * * *